(12) United States Patent
Moller et al.

(10) Patent No.: US 7,777,971 B2
(45) Date of Patent: Aug. 17, 2010

(54) APERTURE STOP DEVICE

(75) Inventors: Gerhard Moller, Aalen (DE); Peter Andrews, Oberkochen (DE); Peter Reimer, Ellwangen (DE)

(73) Assignee: Carl Zeiss Surgical GmbH (DE)

( * ) Notice: Subject to any disclaimer, the term of this patent is extended or adjusted under 35 U.S.C. 154(b) by 0 days.

(21) Appl. No.: 11/032,758

(22) Filed: Jan. 11, 2005

(65) Prior Publication Data

US 2005/0168809 A1    Aug. 4, 2005

(30) Foreign Application Priority Data

Jan. 30, 2004    (DE) ...................... 10 2004 006 066

(51) Int. Cl.
*G02B 9/08* (2006.01)
(52) U.S. Cl. ...................... 359/739; 359/376; 359/380
(58) Field of Classification Search ................ 359/368, 359/376–378, 380, 739, 740
See application file for complete search history.

(56) References Cited

U.S. PATENT DOCUMENTS

| 4,661,692 A * | 4/1987 | Kawasaki ................ 250/201.2 |
| 5,579,772 A * | 12/1996 | Kinukawa et al. ........... 600/476 |
| 5,703,714 A | 12/1997 | Kojima |
| 5,946,131 A | 8/1999 | Wells et al. |
| 6,075,646 A * | 6/2000 | Suzuki ...................... 359/434 |
| 6,348,994 B1 * | 2/2002 | Geier et al. ................ 359/465 |
| 6,384,967 B1 * | 5/2002 | Watanabe et al. ........... 359/385 |
| 6,560,012 B2 * | 5/2003 | Adachi et al. ................ 359/368 |
| 6,674,582 B2 * | 1/2004 | Kawasaki .................. 359/690 |

FOREIGN PATENT DOCUMENTS

| DE | 38 31 481 A1 | 5/1989 |
| DE | 198 12 599 A1 | 9/1999 |
| EP | 0 840 873 B1 | 10/1999 |
| EP | 0 531 543 B1 | 7/2000 |

* cited by examiner

*Primary Examiner*—Stephone B Allen
*Assistant Examiner*—Derek S Chapel
(74) *Attorney, Agent, or Firm*—Gerald E. Hespos; Michael J. Porco

(57) ABSTRACT

An aperture stop device is provided for use in a microscope with at least one adjustable observation parameter. The aperture stop device includes at least one aperture stop (50a, 50b) with an adjustable aperture, that is to say with an adjustable stop opening. The aperture stop (50a, 50b) is adapted to receive an aperture signal representative of an aperture to be adjusted. In addition the aperture stop device includes a control unit (52) for output of the aperture signal to the aperture stop (50a, 50b) in dependence at least on the respectively set value of the observation parameter of the microscope.

18 Claims, 1 Drawing Sheet

APERTURE STOP DEVICE

BACKGROUND OF THE INVENTION

1. Field of the Invention

The present invention concerns an aperture stop device for use in a microscope, in particular in an operating microscope, with an adjustable magnification factor, a microscope, in particular an operating microscope, having a device for adjusting the magnification factor and an aperture stop device according to the invention and a method of adjusting an optical property of a microscope with an adjustable magnification factor.

2. Description of the Related Art

Microscopes and in particular stereoscopic operating microscopes have in the beam path behind the main objective a magnification changer with which different magnification factors can be implemented. The change in magnification can then be effected, while retaining the eyepiece, by changing the magnification factor by means of the magnification changer so that there is no need for a change in the eyepiece for altering the magnification. Zoom systems, also referred to as pancratic systems or vario-systems, or Galilean systems, are used as magnification changers. While a zoom system generally has a lens combination which is to be displaced in relationship relative to each other, a Galilean changer essentially includes a number of various lens combinations which are arranged fixedly relative to each other and which respectively correspond to the lens combination of a Galilean telescope and which can be moved alternately into the microscope beam path. Depending on which of the lens combinations is introduced into the microscope beam path, that then affords a different magnification factor. While a zoom system permits stepless adjustment of the magnification factor, only stepwise adjustment of the magnification factor is possible with a Galilean changer.

The aperture is of particular significance in terms of the resolution capability, light power and depth of focus of a microscope. The aperture is generally established by the orifice of an aperture stop or diaphragm which, when a magnification changer is provided, is connected downstream thereof in the microscope beam path.

A high light power and a high resolution capability require a large aperture, that is to say a large orifice in respect of the aperture stop, whereas a great depth of focus requires a small aperture, that is to say a small orifice in respect of the aperture stop. In order to increase the depth of focus the aperture must be reduced in size, which however results in a lower resolution capability and a lower level of light power for the microscope. If on the other hand the light power or the resolution capability respectively of the microscope is to be increased, then the aperture is to be enlarged, whereby the depth of focus of the microscope is reduced. A high level of light power and a high resolution capability are therefore linked to a low depth of focus and vice-versa.

It is possible for an iris aperture stop to be introduced into the beam path of a microscope. In the case of a stereoscopic operating microscope a so-called double iris aperture stop with a respective iris aperture stop is introduced into the partial beam paths. That iris or double iris aperture stop can be drawn open and closed mechanically so that the aperture which is made available by the aperture stop arrangement can be adjusted. When the aperture of the double iris aperture stop device, that is to say the diameter of the orifices of the irises, is adjusted, that establishes the transmission characteristic of a microscope, that is to say the proportion of the amount of radiation issuing from the microscope in relation to the amount of radiation passing into the microscope, as a function of the magnification factor. The light power characteristic, the resolution characteristic as well as the depth of focus characteristic, that is to say the light power, the level of resolution and the depth of focus respectively as a function of the respectively selected magnification factor, are also established with the transmission characteristic.

In comparison with that state of the art, an object of the present invention is to provide an aperture stop device which can be advantageously used in a microscope with an adjustable microscope parameter.

A further object of the present invention is to provide an improved microscope.

Finally, an object of the invention is to provide an advantageous method of adjusting an optical property of a microscope with an adjustable microscope parameter.

SUMMARY OF THE INVENTION

An aperture stop device according to the invention for use in a microscope with at least one adjustable observation parameter includes at least one aperture stop with an adjustable aperture, that is to say with an adjustable aperture stop orifice. The aperture stop is adapted to receive an aperture signal representing an aperture to be adjusted. In addition the aperture stop device according to the invention includes a control unit for outputting the aperture signal to the aperture stop in dependence at least on the respectively adjusted value of the observation parameter. In that respect parameters influencing representation of the observed section of an object such as for example but not exclusively the magnification factor, the working spacing of the microscope from the observation object or the brightness or intensity of illumination are to be considered as observation parameters.

With the aperture stop device according to the invention the aperture can be adjusted in accordance with a predetermined relationship in dependence on the selected observation parameter. For example adjustment can be effected in dependence on the magnification factor so that, upon a change in the magnification factor, the aperture is adapted automatically in accordance with the predetermined relationship to the newly set magnification factor. In contrast thereto, in the case of microscopes in accordance with the state of the art, there is no adaptation of the aperture when adjusted by means of the iris aperture or double iris aperture arrangement, upon a change in the magnification factor.

By virtue of the choice of a suitable relationship for the dependency of the aperture on the observation parameter, for example the magnification factor, it is possible by means of the aperture stop device according to the invention to embody individual transmission characteristics, for example transmission characteristics which, with a constant brightness in respect of the radiant field, result in a constant brightness in the exit pupil. However it is also possible to embody transmission characteristics which are designed for optimising depth of focus or those which are designed for optimising light power or resolution. In that respect upon a change for example in the magnification factor the aperture only has to be adapted in accordance with the desired transmission characteristic to the adjusted magnification factor. Thus for example the apertures for the respective magnification factors are greater in the case of a light power-optimised transmission characteristics, than the apertures for the individual magnification factors in the case of a transmission characteristic which is optimised in respect of depth of focus.

The transmission characteristic which is optimised in respect of depth of focus and the transmission characteristic which is optimised in respect of light power are of significance in particular in operating microscopes for ophthalmology as a transmission characteristic which is optimised in respect of depth of focus is advantageous in terms of front portion surgery whereas a transmission characteristic which is optimised in respect of light power affords advantages in regard to rear portion surgery. With the aperture stop device according to the invention it is now possible as required to provide a transmission characteristic which is optimised in respect of depth of focus or a transmission characteristic which is optimised in respect of resolution or light power, with the same operating microscope.

In addition, by using a suitable relationship for example between the aperture and the selected magnification factor it is possible to simulate the transmission characteristic of a given piece of optical equipment. More specifically it is found in practice that, particularly in the case of operating microscopes, many surgeons, by virtue of being accustomed over many years to a given transmission characteristic, do not readily accept an optical system involving a different transmission characteristic, even if that optical system should be better from an objective point of view, and they often prefer to continue to operate with an old piece of equipment. In that respect the desired transmission characteristic can be different from one surgeon to another.

The aperture stop device according to the invention also advantageously includes a detector which is connected to the control unit and which detects the adjusted value of the observation parameter. It outputs the detected value of the observation parameter to the control unit, in the form of a parameter signal representative of the value.

The aperture stop can be in particular in the form of an iris aperture stop. By means of an electrical drive, the aperture of such an aperture stop can be varied steplessly between a minimum aperture and a maximum aperture.

In an alternative configuration the aperture stop is in the form of a variable transmission display. Such a display can be for example in the form of an LCD shutter (LCD: Liquid Crystal Display). An LCD shutter has a plurality of pixels which for example can be actuated digitally with the control unit and which, depending on the respective control signal, are in a light-transmitting or opaque state. In its function as an aperture stop, such an LCD shutter has a central region with pixels in the light-transmitting state whereas the peripheral pixels are in the opaque state. The magnitude of the light-transmitting region is varied in the aperture stop device according to the invention by means of the control unit in dependence on the selected value of the observation parameter.

In an advantageous development of the aperture stop device according to the invention, the aperture stop device includes a memory which is to be read out by the control unit and in which there is stored at least one relationship which associates a number of aperture signals with a number of values of the observation parameter. In that respect for example the aperture signals can be in the form of different signal values, signal levels or signal level combinations, which are dependent on the adjusted value of the observation parameter.

Then, by simple memory access, for the detected values of the viewing parameter, the control unit can ascertain the respective aperture signals and pass them to the aperture stop. In that respect the memory which is to be read out by the control unit can be integrated into the control unit itself and thus represent a part of the control unit or it can be an independent unit which is connected to the control unit. It is possible for example for the memory to be a central memory for a plurality of aperture stop devices and to be read out for example by way of a network by the respective control units.

The aperture stop device can also include an input unit which is connected to the memory and/or the control unit for inputting a relationship which is to be stored and which associates a number of aperture signals with a number of values of the observation parameter. Input of a new relationship permits the microscope to be adapted to fresh requirements so that the microscope is to be used in a particularly flexible manner.

For installation in a stereoscopic microscope, in particular in a stereoscopic operating microscope, the aperture stop device according to the invention can include two aperture stops which can respectively receive the aperture signal. When installed in the stereoscopic microscope a respective aperture stop is then associated with a stereoscopic partial beam path.

The aperture stop device according to the invention can also include a switch for switching adjustment of the aperture on and off in dependence on the respectively adjusted value of the observation parameter. If adjustment of the aperture is switched off, in dependence on the respectively adjusted value of the observation parameter, that is to say the aperture stop is uncontrolled, then the aperture is preferably at a maximum, that is to say the stop is completely opened.

A microscope according to the invention includes a device for adjusting an observation parameter, for example the magnification factor, as well as an aperture stop device according to the invention. Whereas in the case of microscopes in accordance with the state of the art the adjusted iris stop orifice is constant for example for all magnification factors, the microscope according to the invention affords the possibility of adapting the aperture of the aperture stop arrangement to the respectively selected magnification factor in such a way that it is possible to implement individual transmission characteristics. That provides that the microscope according to the invention can be used more flexibly than a microscope in accordance with the state of the art. By virtue of a suitable choice of the relationship between the values of the observation parameter and the associated apertures, it is also possible for example to simulate transmission characteristics of other microscopes.

The microscope according to the invention can include in particular a zoom system for adjusting the magnification factor, as the device for adjusting the observation parameter.

The microscope according to the invention can be in particular in the form of a stereomicroscope with two stereoscopic partial observation beam paths and can include an aperture stop device with two aperture stops, wherein an aperture stop is arranged in each of the partial observation beam paths of the stereomicroscope. That design configuration is particularly suitable for operating microscopes.

The method according to the invention of adjusting an optical property of a microscope with an adjustable observation parameter includes the following steps: ascertaining the value of the observation parameter which is set in the microscope and adjusting the aperture of the microscope in dependence on the ascertained value of the observation parameter. Adjustment in dependence for example on the ascertained magnification factor makes it possible to adjust different transmission characteristics for the microscope. That means that it is possible to specifically influence and adjust optical properties of the microscope such as for example the depth of focus or the light power or the resolution respectively, for varying levels of magnification.

Further features, properties and advantages of the present invention will be apparent from the description hereinafter of an embodiment by way of example with reference to the accompanying drawing in which:

DETAILED DESCRIPTION OF THE PREFERRED EMBODIMENT

Figure 1:
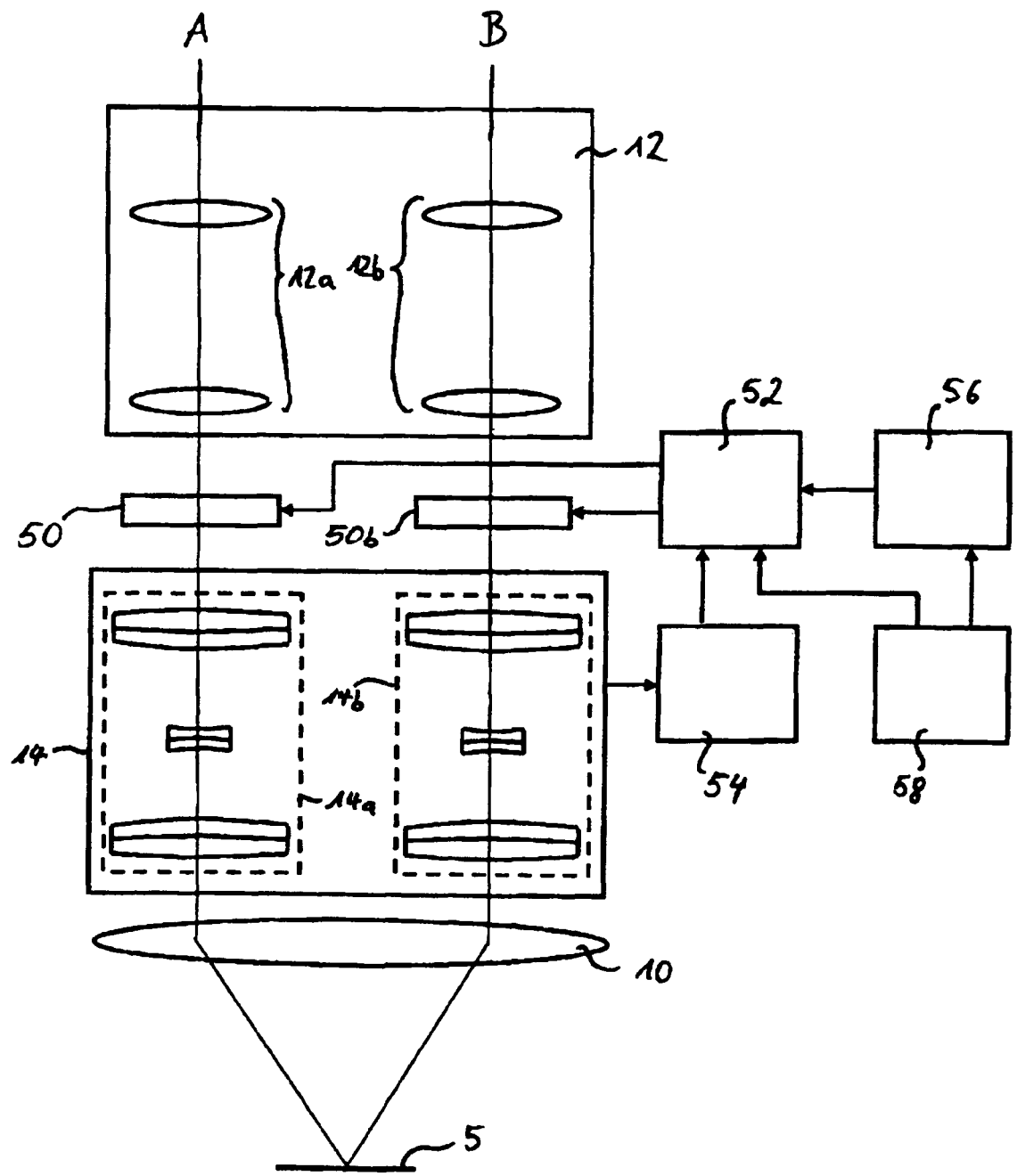
FIG. 1 is a diagrammatic view of an operating microscope equipped with an aperture stop device according to the invention.

An operating microscope with an aperture stop device according to the invention is diagrammatically illustrated in FIG. 1 as an embodiment by way of example of the present invention.

The operating microscope includes an objective optical member 10 which is to face towards the region 5 of an operation, also referred to as the site of an operation, and a binocular optical system 12 which includes a first optical portion 12a for a first stereoscopic partial beam path A and a second optical portion 12b for a second stereoscopic partial beam path B. Connected downstream of the objective 10 in the beam path and arranged upstream of the binocular optical system 12 is a zoom system 14 with which the magnification factor of the microscope can be steplessly adjusted within a given range which generally includes magnification factors of between 0.4 and 2.5. Together with the objective focal length and the eyepiece focal length, the magnification factor determines the magnification of the microscope. In that arrangement the zoom system 14 includes two sub-systems 14a, 14b arranged in the partial beam paths of the microscope.

Arranged in each partial beam path A, B of the microscope between the corresponding zoom system 14a and 14b respectively and the corresponding binocular optical portion 12a, 12b is an aperture stop 50a, 50b with an adjustable aperture. In the present embodiment those aperture stops 50a, 50b are in the form of iris aperture stops which can be opened and closed by means of one or more motor or motors (not shown) which is or are to be electrically driven. In that respect stepless adjustment of the aperture, that is to say the stop orifice, is possible between a maximum aperture and a minimum aperture. The two aperture stops 50a, 50b together form a so-called double iris aperture stop.

The aperture stops 50a, 50b are connected to a microprocessor 52 which operates as a control unit for controlling the stop orifice by means of the motor or motors. The microprocessor 52 is also connected to a detector 54 which is adapted to ascertain the set magnification factor, that is to say the zoom factor. On the basis of the ascertained zoom factor the detector 54 outputs a signal to the microprocessor 52, which represents the set zoom factor.

The microprocessor 52 is also connected to a memory 56 storing at least one relationship between a number of magnification factors and a number of apertures. In that respect the relationship allocates a given aperture to be set, to a given zoom factor. The relationships between the magnification factors and the apertures to be adjusted can be stored in table form in the memory 56. Alternatively it is also possible to store the relationship in the form of a formula which describes the aperture to be set, as a function of the magnification factor.

Admittedly the memory in FIG. 1 is shown in the form of a unit which is separate from the microprocessor 52, but it can also be integrated into the microprocessor 52.

The microscope can also include an input device 58, for example a keyboard, an eye tracking system or a speech input system which is connected to the memory 56 and/or the microprocessor 52. On the one hand new relationships between zoom factors and apertures to be adjusted can be written into the memory by means of the input device 58. On the other hand, when various relationships between zoom factors and apertures to be adjusted are stored in the memory 56, the input device 58 can serve as a selector device for selecting one of those relationships for application to the aperture of the aperture stops 50a, 50b. In a deviation in relation to the embodiment by way of example it is also possible to provide a selector device which is separate from the input unit 58, for example a keyboard.

Depending on the respectively selected relationship between zoom factors and aperture stops, it is possible to adjust different transmission characteristics of the operating microscope. That makes it possible for example to adjust the operating microscope for front portion surgery to a transmission characteristic which is optimised in respect of depth of focus whereas it can be set to a transmission characteristic which is optimised in respect of light power and resolution, for rear portion surgery. If both relationships, namely that for the characteristic which is optimised in respect of depth of focus and the characteristic which is optimised in respect of light power and resolution respectively are already stored in the memory 56, it is sufficient to select the appropriate relationship by means of the input device 58 or the separate selector device, in order to implement optimisation of the microscope. If one of those relationships or both relationships are not stored in the memory 56, the input device also permits an input of the required relationship into the memory 56.

In addition the input device 58 also makes it possible to write into the memory relationships which simulate the transmission characteristic of another operating microscope. That can be desirable for example if a doctor performing an operation is accustomed to another operating microscope and would like to perform the operation under the conditions which the other operating microscope would have made available.

By virtue of the possibility of individually programming the relationship between the magnification factor and the aperture of the aperture stops, the operating microscope can be used in a particularly flexible fashion.

Admittedly, the operating microscope illustrated in relation to FIG. 1 uses iris aperture stops as aperture stops with an adjustable aperture, but it is also possible to use transmission displays which are to be varied, as aperture stops with an adjustable aperture. For example a liquid crystal display (LCD) is suitable as a transmission display to be varied. Such a display has a pixelated structure, wherein the pixels can be individually switched to and fro between a light-transmitting and opaque state. In that way it is possible to provide a plurality of different apertures, by means of suitable actuation by means of the microprocessor. In particular it is also possible to involve different geometrical shapes for the apertures. It is thus possible for example to embody round apertures but also angular apertures, for example quadrangular apertures. The liquid crystal displays are suitable in particular for digital actuation by the microprocessor.

The aperture stop device according to the invention is suitable in particular for use with a zoom system, that is to say a steplessly adjustable magnification changer, but it can also be used together with a magnification changer which only permits stepwise adjustment of the magnification factor.

The aperture which is to be adjusted in the illustrated embodiment at an aperture stop can also depend on other parameters, instead of the set magnification factor. Thus it is possible for example for the control unit to output the aperture signal not in dependence on the magnification factor but in dependence for example on the lighting strength with which the operating area is illuminated, or the observation distance. Output of the aperture signal in dependence on a combination of two or more of those parameters is also possible.

What is claimed:

1. An aperture stop device in an observation beam path of a microscope, the microscope having at least one adjustable observation parameter, comprising at least one aperture stop with an adjustable aperture in an observation beam path of the microscope, which receives an aperture signal representative of an aperture to be adjusted, a control unit for outputting the aperture signal to the aperture stop in dependence at least on a respectively adjusted value of the at least one adjustable observation parameter, wherein the at least one adjustable observation parameter is at least one magnification factor, a memory storing different relationships between at least two different values of the aperture and the adjusted value of the available magnification factors, wherein each different relationship describes the aperture to be adjusted as a function of the adjusted value of the available magnification factors to implement different transmission characteristics in the observation beam path, and a selector device for selecting one of the stored different relationships based on a desired transmission characteristic in the observation beam path for application of the selected relationship to the aperture of the aperture stops.

2. The aperture stop device of claim 1, wherein output of the aperture signal to the aperture stop is effected in further dependence on a different at least one observation parameter, the different at least one observation parameter including the value of the working distance of the microscope from the object being observed or the brightness or the intensity of the illumination.

3. The aperture stop device of claim 1, further comprising a detector connected to the control unit for detecting the adjusted value of the at least one magnification factor and for outputting to the control unit a parameter signal representative of the detected value of the at least one magnification factor.

4. The aperture stop device of claim 1, wherein the aperture stop is an iris stop.

5. The aperture stop device of claim 1, with a transmission display to be varied as the aperture stop.

6. The aperture stop device of claim 5 with a liquid crystal display (LCD) shutter as the transmission display to be varied.

7. The aperture stop device of claim 1, further comprising an input device which is connected to at least one of the memory and the control unit for inputting a relationship which is to be stored and which associates a number of aperture signals with a number of values of the at least one adjustable observation parameter.

8. The aperture stop device of claim 1, wherein the at least one aperture stop includes two aperture stops with an adjustable aperture, which are respectively adapted to receive the aperture signal.

9. The aperture stop device of claim 1, further comprising a switch for switching adjustment of the aperture on and off in dependence on the respectively set value of the at least one adjustable observation parameter.

10. The aperture stop device of claim 1, wherein the transmission characteristic is a constant brightness in respect to the radiant field.

11. The aperture stop device of claim 1, wherein the transmission characteristic is depth of focus.

12. The aperture stop device of claim 1, wherein the transmission characteristic is light power.

13. The aperture stop device of claim 1, wherein the transmission characteristic is resolution.

14. A microscope comprising:

a device for adjusting the value of an observation parameter, and an aperture stop device including at least one aperture stop with an adjustable aperture located in an observation beam path of the microscope, which receives an aperture signal representative of an aperture to be adjusted, a control unit for outputting the aperture signal to the aperture stop in dependence at least on a respectively adjusted value of the observation parameter, wherein the at least one observation parameter is at least one magnification factor, a memory storing different relationships between at least two different values of the aperture and the adjusted value of the available magnification factors, wherein each different relationship describes the aperture to be adjusted as a function of the adjusted value of the available magnification factors to implement different transmission characteristics in the observation beam path, and a selector device for selecting one of the stored different relationships based on a desired transmission characteristic in the observation beam path for application of the selected relationship to the aperture of the aperture stops.

15. The microscope of claim 14 wherein the device for adjusting the value of the observation parameter is a zoom system for adjusting the magnification factor as the observation parameter to be adjusted.

16. The microscope of claim 15, further comprising a detector connected to the zoom system for detecting the adjusted value of the magnification factor and for outputting to the control unit a parameter signal representative of the detected value of the magnification factor.

17. The microscope of claim 14, wherein the microscope is a stereomicroscope with two observation beam paths and wherein the aperture stop device comprises two aperture stops arranged respectively in each of the two observation beam paths.

18. A method of adjusting an optical property of a microscope with an adjustable magnification factor, comprising the steps:

providing an adjustable aperture in an observation beam path of the microscope, storing in a memory different relationships between at least two different values of the aperture of the microscope and an adjusted value of the available magnification factors, wherein each different relationship describes the aperture to be adjusted as a function of the adjusted value of the available magnification factors to implement different transmission characteristics in the observation beam path, ascertaining the adjusted value of the available magnification factors set in the microscope, selecting one of the different stored relationships based on a desired transmission characteristic in the observation beam path for application of the selected relationship to the adjustable aperture of the microscope, and adjusting the aperture of the microscope in dependence on the ascertained value of the available magnification factors according to the selected relationship to implement the selected desired transmission characteristic in the observation beam path.

* * * * *